(12) United States Patent
Mikkelsen

(10) Patent No.: US 12,466,605 B2
(45) Date of Patent: Nov. 11, 2025

(54) CONTAINER WITH PAPERBOARD OUTER LAYER AND THIN PLASTIC FOIL INNER LAYER

(71) Applicant: BERRY SUPERFOS RANDERS A/S, Taastrup (DK)

(72) Inventor: Kasper Mikkelsen, Taastrup (DK)

(73) Assignee: BERRY SUPERFOS RANDERS A/S, Taastrup (DK)

(*) Notice: Subject to any disclaimer, the term of this patent is extended or adjusted under 35 U.S.C. 154(b) by 608 days.

(21) Appl. No.: 17/607,074

(22) PCT Filed: Apr. 29, 2020

(86) PCT No.: PCT/EP2020/061947
§ 371 (c)(1),
(2) Date: Oct. 28, 2021

(87) PCT Pub. No.: WO2020/221825
PCT Pub. Date: Nov. 5, 2020

(65) Prior Publication Data
US 2022/0194652 A1    Jun. 23, 2022

(30) Foreign Application Priority Data
Apr. 29, 2019   (DK) .............................. PA201970272

(51) Int. Cl.
*B65D 3/22*     (2006.01)
*B31B 50/26*   (2017.01)
(Continued)

(52) U.S. Cl.
CPC ................ *B65D 3/22* (2013.01); *B31B 50/26* (2017.08); *B31B 50/62* (2017.08); *B31B 50/745* (2017.08);
(Continued)

(58) Field of Classification Search
CPC ... B65D 3/22; B65D 3/06; B65D 3/14; B65D 5/563; B65D 2565/385; B65D 2251/0018;
(Continued)

(56) References Cited

U.S. PATENT DOCUMENTS 2,736,065 A    2/1956   Fulton
3,390,618 A    7/1968   Mcardle
(Continued)

FOREIGN PATENT DOCUMENTS

DE    1109507     6/1961
DE    1786135     11/1971
(Continued)

OTHER PUBLICATIONS

International Search Report and Written Opinion for PCT/EP2020/061947 dated Aug. 24, 2020.
1st technical examination for PA 2019 70272 dated Nov. 6, 2019.

*Primary Examiner* — Christopher R Demeree
(74) *Attorney, Agent, or Firm* — Barnes & Thornburg LLP (57) ABSTRACT

A container comprising a bottom and a sidewall extending upwards from the bottom and terminating at an upper free edge, said upper free edge of the sidewall forming an opening of the container, said sidewall and said bottom comprising an outer paperboard layer and a thin inner plastic foil layer, formed in a thermoforming operation, said upper free edge of the sidewall comprising a rim portion extending past the outer surface of the paperboard layer of the sidewall. The rim portion comprises a rolled up portion of an upper portion of the outer paperboard layer of the sidewall, said rolled up portion being covered by a portion of the thin inner plastic foil layer. In this way, a stiff upper rim is provided, while allowing the use of a very thin inner plastic foil layer.

11 Claims, 6 Drawing Sheets

(51) Int. Cl.

| | | |
|---|---|---|
| *B31B 50/62* | (2017.01) | |
| *B31B 50/74* | (2017.01) | |
| *B65D 3/06* | (2006.01) | |
| *B65D 3/14* | (2006.01) | |
| *B65D 5/56* | (2006.01) | |
| *B31B 105/00* | (2017.01) | |
| *B31B 110/10* | (2017.01) | |
| *B31B 120/00* | (2017.01) | |
| *B31B 120/10* | (2017.01) | |
| *B31B 120/40* | (2017.01) | |

(52) U.S. Cl.
CPC .................. *B65D 3/06* (2013.01); *B65D 3/14* (2013.01); *B65D 5/563* (2013.01); *B31B 2105/0022* (2017.08); *B31B 2110/10* (2017.08); *B31B 2120/004* (2017.08); *B31B 2120/10* (2017.08); *B31B 2120/406* (2017.08); *B65D 2565/385* (2013.01)

(58) Field of Classification Search
CPC .... B65D 2251/0093; B65D 2577/2025; B65D 25/14; B65D 2543/00638; B65D 81/3453; B29C 57/12; B29C 51/162; B29C 66/7234; A47G 19/2205; B32B 27/10; B32B 2439/00
USPC ... 229/5.84, 400, 401, 402, 403, 405, 162.5, 229/164.2, 906.1; 156/293; 206/217, 206/499
See application file for complete search history.

(56) References Cited

U.S. PATENT DOCUMENTS

| | | | | |
|---|---|---|---|---|
| 3,866,816 | A * | 2/1975 | Bemiss | B65D 81/3415 229/162.1 |
| 4,325,905 | A * | 4/1982 | Takahashi | B65D 3/12 264/516 |
| 4,342,183 | A * | 8/1982 | Gordon | B29C 51/04 264/516 |
| 4,489,537 | A * | 12/1984 | Gordon | B65D 77/04 53/511 |
| 5,253,801 | A * | 10/1993 | Bernstein | B65D 5/2047 229/113 |
| 6,234,386 | B1 * | 5/2001 | Drummond | B29C 66/028 229/5.5 |
| 7,462,261 | B2 * | 12/2008 | Nonomura | B29C 57/12 162/227 |
| 10,315,791 | B2 * | 6/2019 | Rea | B65B 61/20 |
| 10,647,466 | B2 * | 5/2020 | Zwaga | B65D 5/563 |
| 11,565,863 | B2 * | 1/2023 | Mondini | B31B 50/44 |
| 2004/0105941 | A1 | 6/2004 | Terada et al. | |
| 2004/0222569 | A1 | 11/2004 | Mader | |
| 2014/0183198 | A1 | 7/2014 | Slack | |

FOREIGN PATENT DOCUMENTS

| | | | | |
|---|---|---|---|---|
| EP | 0974522 | | 1/2000 | |
| GB | 2577284 | A * | 3/2020 | ............ B31B 50/82 |
| WO | 2011056398 | | 5/2011 | |
| WO | 2014108698 | | 4/2014 | |

* cited by examiner

CONTAINER WITH PAPERBOARD OUTER LAYER AND THIN PLASTIC FOIL INNER LAYER

CROSS REFERENCE TO RELATED APPLICATIONS

This application is a U.S. national stage application under 35 U.S.C. § 371 (b) of International Application No. PCT/EP2020/061947, filed Apr. 29, 2020, which claims priority to the Danish Patent Application No. PA201970272, filed on Apr. 29, 2019, the disclosures of both of which are hereby expressly incorporated by reference in their entirety.

The current specification relates to a container comprising a bottom and a sidewall extending upwards from the bottom and terminating at an upper free edge, said upper free edge of the sidewall forming an opening of the container, said sidewall and said bottom comprising an outer paperboard layer and a thin inner plastic foil layer, said upper free edge of the sidewall comprising a rim portion extending past the outer surface of the paperboard layer of the sidewall. In one preferred embodiment, the inner plastic foil layer is a thermoformed inner plastic foil layer.

According to the current specification, the term "thermoforming" should be understood as a process where a plastic sheet or foil is heated and then inserted into a mould where it is formed into a shape defined by the mould. The forming could be performed by a die, which presses into the plastic sheet, by applying a pressurized gas and/or by applying a vacuum. A combination of these could also be used. For example, in one example, a mechanical pressure is applied by a die in a first part of the process to pre-stretch the sheet and then a pressure and/or a vacuum is applied to finish the forming operation.

For the sake of this specification, the term paperboard should be understood as a thick paper-based material, in contrast to paper, which is thinner and more flexible. Within the scope of the current specification, paperboard can be made from many different types of raw material. Typically, a wood-based material is used, however other forms of base material, for example straw, hemp, cotton, etc could also be used. The paperboard could be made from virgin or recycled materials.

For the sake of this specification, the plastic layer could be made from any type of suitable plastic. Such plastics will be known to the person skilled in the art of thermoforming. The plastic could be food or non-food grade depending on the application of the finished container. It will be possible to use multilayer and mono-material plastic films as well. For example, in one example a multilayer film could be used comprising both a barrier layer, for example EVOH, and a Poly Propylene (PP) layer. Another suitable material for the plastic layer is PET as this can be stretched a lot while maintaining its strength. PET is also readily available in a food grade recycled material. PET also has good barrier properties.

DESCRIPTION OF RELATED ART

Containers as described in the opening paragraph are well known in the art. In one prior art process currently used by the applicant, a paperboard blank is folded and then inserted into a mould. A plastic foil inner layer is then thermoformed directly on the inside of the folded paperboard blank. See FIGS. 3a-3c and the associated description below which describes the prior art process. Prior to the thermoforming operation, an adhesive is applied on the inside surface of the paperboard blank. When the plastic foil is thermoformed, the foil adheres to the paperboard blank forming a strong bond. In another prior art solution, a paperboard blank is folded into a paperboard container in a first step, then a plastic foil is thermoformed in a second step and then the thermoformed plastic foil is inserted into the folded paperboard container. In certain cases, the plastic foil and the paperboard container are glued or welded together. In other solutions, the upper portion of the inner plastic foil is formed with attachment means which grip onto corresponding attachment means on the upper rim of the paperboard container.

The container could be in the shape of a round cup, as will be described later on in this specification with concrete examples. However, it could also be formed in other shapes. One example is as a rectangular tub (known from, for example, spreadable butter packaging and spreadable cheese packaging).

Typically, the upper rim of the container is provided as a surface onto which it is possible to weld (heat seal) a lid made of a thin barrier foil of different materials to seal the contents of the container. Depending on the type of weld, the lid can be peeled off or cut off when it is desired to access the contents of the containers.

In other cases, a snap on lid could be snapped onto the upper rim of the container. This will allow the container to be opened and then re-closed. In certain cases, the container could be formed with both a welded foil lid as well as a snap on lid. When it is desired to access the contents of the container, the snap on lid can be removed first, then the foil lid can be peeled or cut off. The user can then use the snap on lid to re-seal the container. This is well known from, for example, yoghurt containers.

The combination of the two materials in this type of container provides a container which is stiff due to the paperboard layer and has the barrier properties of the plastic layer.

The intended use for these types of products is primarily food packaging but it is not limited to food packaging. This container will be suitable for any use where a thin plastic barrier and a relatively rigid packaging in general are required.

Prior art type containers as described above are typically made with a relatively thick foil layer due to strength requirements of the upper rim of the container. This increases the cost of the container and increases the use of plastic material.

The prior art type containers as described above are also typically made in a way in which it is difficult to separate the paperboard and plastic layers from each other. This makes recycling more difficult.

SUMMARY OF THE INVENTION

It is therefore a first aspect of the invention to provide a paperboard container as discussed in the opening paragraph which has an inner plastic foil layer with a reduced thickness in comparison to prior art containers.

A second aspect of the invention is to provide a paperboard container as discussed in the opening paragraph which is manufactured in a way such that the plastic and paperboard layers are easier to separate from each other.

A third aspect of the invention is to provide a paperboard container as discussed in the opening paragraph which comprises a reduced amount of plastic in comparison to prior art type containers. This is both for cost reasons as well as environmental reasons.

These aspects are provided at least in part by a container as mentioned in the opening paragraph where the rim portion comprises a rolled up portion of an upper portion of the outer paperboard layer of the sidewall, said rolled up portion being covered by a portion of the thin inner plastic foil layer. In this way, a container is provided which has a strong and stiff upper rim portion while making it possible to use a very thin layer of plastic material. In this way, the plastic content of the container can be reduced significantly, without decreasing the strength of the container or the rim portion.

According to one embodiment, the thin inner plastic foil layer is made from a plastic foil having a thickness of less than 500 um prior to the thermoforming operation. In one embodiment, the thin inner plastic foil layer is made from a plastic foil having a thickness of less than a thickness T um found by the formula T=200*surface area of stretched foil/surface area of unstretched foil. In one embodiment, the thin inner plastic foil layer is made from a plastic foil having a thickness of less than a thickness T um found by the formula T=150*surface area of stretched foil/surface area of unstretched foil. In one embodiment, the thin inner plastic foil layer is made from a plastic foil having a thickness of less than a thickness T um found by the formula T=100*surface area of stretched foil/surface area of unstretched foil. In these three embodiments, the surface area of the unstretched foil, should be the area of the portion of the foil which will be stretched in the thermoforming operation.

In one embodiment, the container comprises less than 30% plastic material by weight.

In one embodiment, the stiffness of the rolled up portion of the outer paperboard layer of the sidewall is greater than the stiffness of the portion of the thermoformed inner plastic foil layer which covers said rolled up portion.

In one embodiment, the rolled up portion of the outer paperboard layer could be pressed flat. This will provide a flat upper surface for the rim portion.

In one embodiment, the outer paperboard layer and the thin inner foil layer could be joined together with an adhesive. This can be useful in the case where the inner foil layer is very thin, as the inner foil layer will have a much reduced strength. In one embodiment, an adhesive layer covers the entire inner surface of the outer paperboard layer of the sidewall and/or the bottom. In one embodiment, the adhesive layer is applied in a pattern comprising both adhesive comprising areas and empty areas.

In one embodiment, the paperboard layer of the bottom is covered with adhesive while the paperboard layer of the sidewall is not covered with adhesive. This will reduce the amount of adhesive used and will make handling the sidewall easier during the production process.

In one embodiment, the outer paperboard layer of the bottom could comprise a first paperboard portion covering the bottom of the container and a second paperboard portion which is folded away from the first paperboard portion, an inner surface of said first paperboard portion could be in contact with an outer surface of the thin inner plastic foil layer, and an outer surface of said second paperboard portion could be abutting an inner surface of the outer paperboard layer of the sidewall. In this way, a strong bottom construction can be provided.

In one embodiment, the upper rim of the container is arranged in a horizontal plane and has a rectangular shape with rounded corners and in that the bottom is arranged in a horizontal plane and has a rectangular shape with rounded corners. In another embodiment, the upper rim of the container is arranged in a horizontal plane and has a circular shape and in that the bottom is arranged in a horizontal plane and has a circular shape.

In one embodiment, there is an air gap between the outer paperboard layer of the sidewall and the outer paperboard layer of the bottom. By airgap is meant that the joint between the sidewall and the outer paperboard layer of the bottom is formed to allow air to pass between the two layers. For example, if the joint is glued, there could be gaps in the glue to allow the air to escape between the two layers. In one embodiment there is at least one air hole in the paperboard layer of the bottom close to the junction between the outer paperboard layer of the bottom and the outer paperboard layer of the sidewall. In this way, air can escape the container during the thermoforming operation. In one embodiment, an array of air holes is provided around the outer periphery of the bottom. In one embodiment, the at least one air hole is in the form of a through going hole which is cut or punched in the paperboard layer of the bottom.

In one embodiment the outer paperboard layer of the rim portion of the sidewall has an outer circumference C and an upper portion of the inner plastic foil layer comprises a pull tab portion which extends past the outer circumference C of the paperboard portion of the rim portion. Due to the pull tab, the user can grab the pull tab and easily separate the thin foil layer from the paperboard container. This will make it easier to recycle the container properly.

In one embodiment, the pull tab portion comprises an elongated portion of reduced strength arranged outside the outer circumference C of the outer paper board layer of the rim portion of the sidewall. I this way, the stiffness of the pull tab can be reduced and allow the pull tab to bend down when a lid is snapped onto the container. In one embodiment, the elongated portion extends across the pull tab portion.

In one embodiment, the pull tab portion comprises a cutout portion arranged in the central area of the pull tab adjacent to and outside the outer periphery of the rolled up portion of the paperboard layer. In this way, an edge of the cutout portion could form an additional edge for connection to a snap on lid.

In one embodiment, the elongated portion of reduced strength is a line cut extending partially through the thickness of the pull tab portion or a line of perforations extending at least partially through the thickness of the pull tab portion.

In one embodiment, the paperboard layer of the sidewall and/or the bottom comprise at least one recess extending at least partially through the paperboard layer of the sidewall and/or the bottom respectively and in that the thin inner plastic foil layer extends into the at least one recess. In this way a mechanical connection can be established between the thin inner plastic foil layer and the outer paperboard layer to provide a more structurally strong container.

In one embodiment, the paperboard layer of the side wall comprises said at least one recess. In one embodiment, the at least one recess is arranged as a through going hole or as a depression in the paperboard layer.

In one embodiment, said at least one recess has a shape with a straight section at the upper side of the recess, said straight section having a portion which is perpendicular to a centre axis of the container. In this way, the straight section can provide a hold for the thin inner plastic foil layer to prevent it from sliding up the inside surface of the paperboard layer.

In one embodiment, the at least one recess is arranged in the lower 20% or the upper 20% of the container. By arranging the recess near the top, the thickness of the foil layer will be thicker since it has not stretched as much. By arranging the recess near the bottom, the bottom portion of the thin inner plastic foil layer will be held better in place.

In one embodiment, said at least one recess is arranged on an inner portion of the paperboard layer of the sidewall which is overlapped by an outer portion of the paperboard layer of the sidewall. In this way, the inner recess is "hidden" by the overlapping portion of the paperboard layer.

In one embodiment, the at least one recess comprises a plurality of recesses arranged one above the other along a portion of the sidewall which is overlapping. This will provide an even stronger connection.

In one embodiment, the container further comprises a foil lid portion which is welded, glued or heat sealed to the rim portion of the sidewall. In one embodiment, the container further comprises a removable lid, which can reseal the container after opening. In one embodiment, the container comprises a snap on lid which snaps onto an outer exposed edge of the thin plastic foil layer.

In one embodiment, the container comprises both a foil lid and a snap on lid. In one embodiment, the foil lid comprises a pull tab. In one embodiment, the pull tab portion of the foil lid and the pull tab portion of the thin inner foil layer are arranged with markings to distinguish them from each other. In this way, it is avoided that a user could pull off the inner plastic layer before removing the lid.

In one embodiment the pull tab portion of the foil lid and the pull tab portion of the thin inner foil layer are arranged rotated with respect to each other about the centre axis of the container. This will again make it easier for the user to identify the two different pull tabs and avoid the risk of pulling the wrong tab first.

The invention also relates to a method of manufacturing a container where the method comprises the steps of: (a) providing a paperboard bottom blank, (b) providing a paperboard sidewall blank, (c) assembling and/or folding the paperboard bottom blank and the paperboard sidewall blank into a paperboard container having a paperboard bottom and a paperboard sidewall extending from the paperboard bottom, (d) rolling an upper free edge of the paperboard sidewall into a paperboard rim portion which extends outwardly from the paperboard sidewall, (e) thermoforming a thin plastic foil layer with an outer surface which corresponds to the inner surface of the paperboard container, and (f) arranging the thin plastic foil layer inside the paperboard container such that the thin plastic foil layer covers the inner surface of the paperboard container and an upper surface of the paperboard rim portion.

In one embodiment, the paperboard rim portion is pressed flat after rolling the paperboard rim portion. In one embodiment, the paperboard rim portion is pressed flat prior to the thermoforming operation.

In one embodiment of the method, the steps of thermoforming the thin plastic foil layer and arranging the thin plastic foil layer inside the paper board container comprise the steps of: (a) placing the paperboard container inside a thermoforming mould, (b) thermoforming the thin plastic foil layer directly inside the paperboard container and (c) removing the container from the thermoforming mould.

In one embodiment, the method further comprises the step of applying an adhesive to the inner surface of the paperboard sidewall prior to thermoforming the thin plastic foil layer.

In one embodiment, the method further comprises providing the thin plastic foil layer as a thin plastic foil sheet and cutting the thin plastic foil layer after the thermoforming operation to separate the thermoformed portion of the thin plastic foil layer from the rest of the thin plastic foil sheet. In one embodiment, the step of cutting the thin plastic foil sheet is provided after the container is removed from the thermoforming mould.

In one embodiment of the method, the step of cutting the thin plastic foil layer includes providing a pull tab portion extending away from the upper rim of the container.

In one embodiment, the method further comprises a step of providing an elongated area of reduced strength on the pull tab, on a portion of the pull tab which is arranged outside an outer periphery of the paperboard layer of the upper rim.

In one embodiment, the step of providing an elongated area of reduced strength on the pull tab is provided by a knife which cuts at least partially through the thickness of the pull tab.

In one embodiment, the step of providing an elongated area of reduced strength on the pull tab is performed between the step of inserting the paperboard layer into the thermoforming mould and the step of removing the container from the thermoforming mould.

In one embodiment of the method the steps of thermoforming the thin plastic foil layer and arranging the thin plastic foil layer inside the paperboard container comprise the steps of: (a) thermoforming the thin plastic foil layer in a thermoforming mould, (b) transferring the thermoformed thin plastic foil layer to an assembly station, (c) transferring the paperboard container to an assembly station, and (d) placing the thermoformed thin plastic foil layer inside the paperboard container at the assembly station.

In one embodiment, an adhesive is applied to the inner surface of the paperboard container, and/or the outer surface of the thin plastic foil layer prior to placing the thermoformed thin plastic foil layer in the paperboard container.

In one embodiment, the thermoformed thin plastic foil layer is thermoformed from a continuous web of thin foil material and then the thermoformed thin plastic foil layer is transferred to the assembly station prior to removing the thermoformed thin plastic foil layer from the continuous web of thin foil material.

It should also be emphasized that the term "comprises/comprising/comprised of" when used in this specification is taken to specify the presence of stated features, integers, steps or components but does not preclude the presence or addition of one or more other features, integers, steps, components or groups thereof. In addition, it should be noted that the specification also discloses additional inventions which are not specifically listed in the claims, but which could form the basis for future divisional applications.

BRIEF DESCRIPTION OF THE DRAWINGS

In the following, the invention will be described in greater detail with reference to embodiments shown by the enclosed figures. It should be emphasized that the embodiments shown are used for example purposes only and should not be used to limit the scope of the invention.

DETAILED DESCRIPTION OF THE EMBODIMENTS

Figure 1:
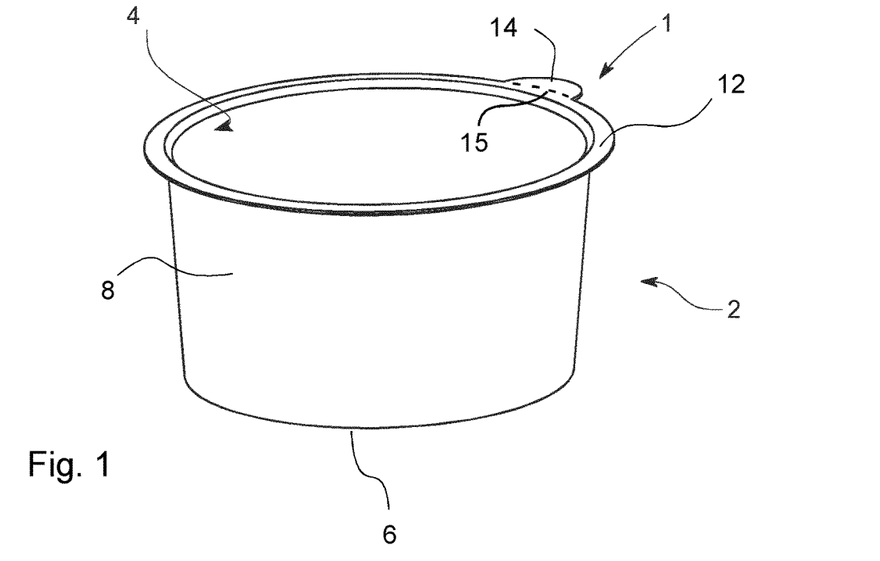
FIG. 1 shows an assembled perspective view of one embodiment of a container according to the invention.
Figure 2:
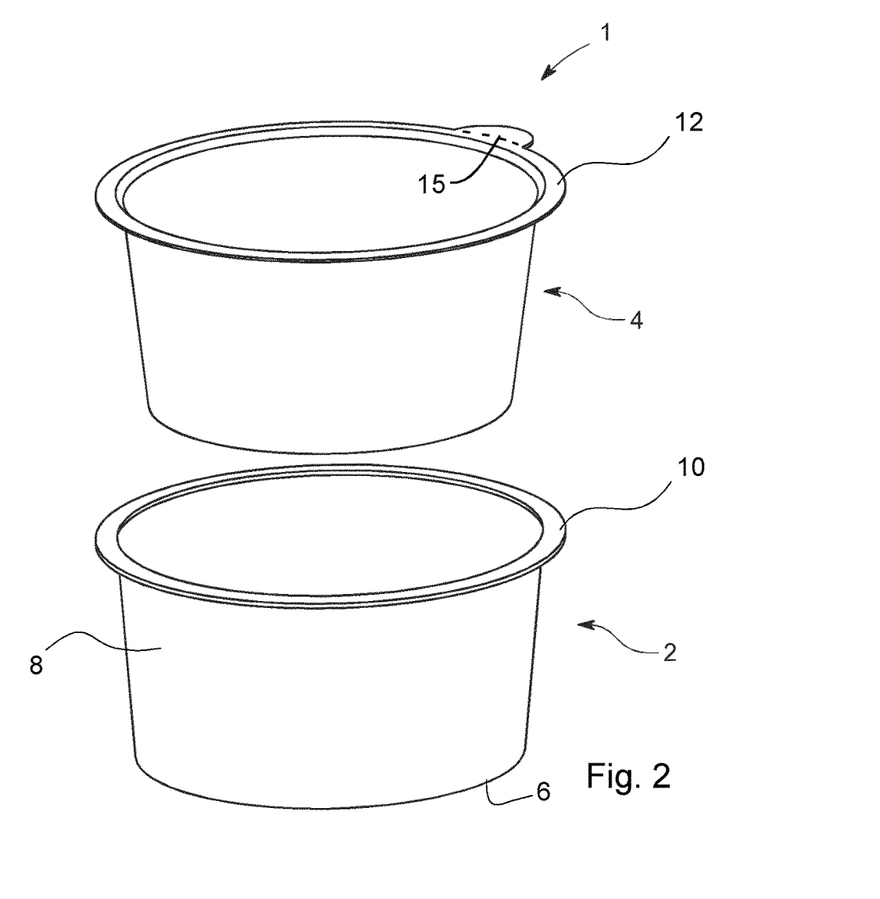
FIG. 2 shows an exploded perspective view of the container of FIG. 1.

FIGS. 1 and 2 schematically show different views of a first embodiment 1 of a container according to the current invention.

The container comprises a paperboard outer layer 2 and an inner thermoformed plastic foil layer 4. The paperboard outer layer is formed with a paperboard bottom 6 and a paperboard sidewall 8.

The paperboard sidewall 8 is formed with a rolled upper edge 10 which is then pressed flat to form a flat upper rim portion 10. By rolling and pressing the upper edge portion of the paperboard of the sidewall, the upper rim portion already has a certain amount of strength and the plastic foil layer therefore does not have to be so thick or strong. The foil layer can then be significantly reduced in thickness in comparison to the prior art containers, resulting in lower thermoforming forces and in lower plastic material consumption. In the current embodiment, the plastic foil layer starts as a film with a thickness of 500 μm. The interior diameter of the container is 95 mm. The surface area of the unstretched portion of the foil is around 7000 mm^2. The surface area of the stretched portion of the foil is around 28000 mm^2. Hence the ratio of stretched to unstretched foil is around 4. The thickness of the stretched portion of the foil will theoretically be around 125 μm. In the real product however, there will be small variations due to uneven stretching of the material.

In addition, since the foil thickness is reduced, it is easier to peel the foil layer from the cardboard layer, as the inner plastic foil layer is easier to deform.

This is especially true of the upper rim portion 12 of the foil layer which can now be made thin and flexible.

In order to make it even easier to remove the plastic inner layer from the paperboard outer layer, a pull tab 14 is provided on the upper portion of the foil layer. In this case, the pull tab extends past the outer circumference of the paperboard rim. In this case, the user can grip the paperboard container 2 with one hand and then hold on to the pull tab 14 with the other hand and pull the two parts apart from each other. A line of perforations 15 is provided to ensure that the pull tab 14 is not too stiff. This is especially important in the case where a snap on lid is to be snapped onto the upper rim of the container. Should the pull tab be too stiff, it will be difficult to snap a lid onto the container or the lid will easily pop off.

It should be noted that while the thin plastic foil layer is quite thin when compared to similar prior art containers, the upper portion of the thin plastic foil layer is still thick enough to result in a rather stiff pull tab. This is especially due to the fact that during the thermoforming operation, the sidewall portion of the thin plastic foil layer is stretched. In order to avoid the plastic foil layer from getting too thin and breaking during the thermoforming operation, the upper part of the thin plastic foil layer from which the pull tab is made, needs to be a certain thickness, which is still quite stiff. In the figures, the thickness of the thin plastic foil layer is shown as uniform, however, it will be clear to the person skilled in the art that during the thermoforming operation, different portions of the thin inner plastic foil layer will have different thicknesses and hence also different stiffness.

In the current embodiment, a line of perforations is provided to reduce the strength or stiffness of the pull tab. In the current embodiment, the line of perforations is provided along an elongated area arranged outside the outer circumference of the paperboard rim. While a line of perforations is one way of providing an elongated area of reduced strength, other methods are also possible and included within the scope of the current disclosure. For example, a thin cut extending only partially through the thickness of the pull tab could be one option. Another option is to thermally melt an elongated portion of the pull tab to reduce its thickness. Other options will also be available to the skilled person.

In one manufacturing process, the elongated weakened area could be provided while the container is in the thermoforming mould. This could, for example be arranged during the step of closing the mould by arranging a knife or other cutting implement in one of the mould halves. The elongated weakened area could be provided on the top or the bottom of the pull tab.

In one embodiment, an adhesive is applied between the paperboard and the foil. This results in a very strong construction, even though a foil layer with a significantly reduced thickness is used. However, in other embodiments, an adhesive is not necessary.

Compared to currently available containers made of separate paper and plastic layers, which typically have a ratio of approximately 50%/50% plastic and cardboard, we estimate that the new containers according to this invention can have as low as 20% plastic content by weight (pre-tests have shown around 25% on samples made crudely in the lab).

Figure 3A:
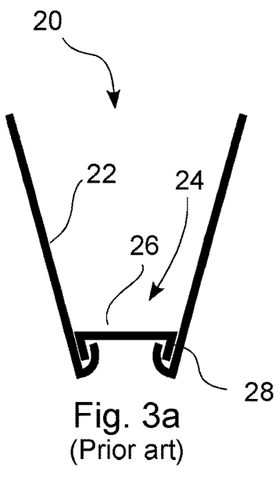
FIGS. 3a-3c schematically show three steps according to a prior art method of manufacturing a combined plastic and paperboard container.
Figure 3B:
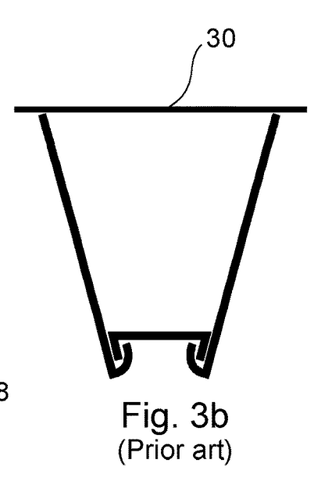
Figure 3C:
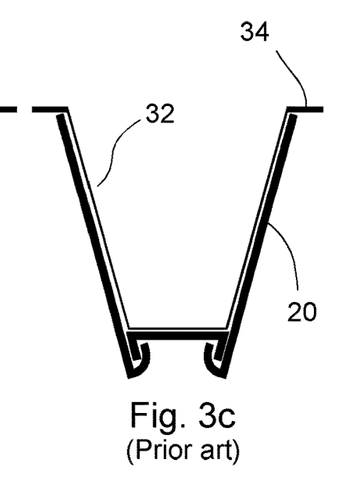

FIGS. 3a-3c illustrate three steps in a prior art process of manufacturing a combined paper and plastic container 20. In a first step, a paperboard sidewall blank 22 is folded together with a paperboard bottom blank 24 in a traditional manner to form a paperboard cup. The paperboard bottom blank is folded into a first paperboard portion 26 which covers the bottom of the container and a second paperboard portion 28 which is folded down from the first paperboard portion. The outer surface of the second paperboard portion abuts the inner surface of the folded paperboard sidewall 22. In the next step, the folded paperboard cup is transferred to a thermoforming mould (not shown) where a plastic foil sheet 30 is arranged on the paperboard container. In a third step, the plastic foil sheet is thermoformed directly into the paperboard container to form a thermoformed inner foil layer 32 arranged on the inner surface of the paperboard container 20. In certain embodiments, an adhesive is applied to the inner surface of the paperboard container prior to thermoforming the plastic foil layer.

As can be seen from FIG. 3C, the upper rim 34 of the container is formed from the plastic foil sheet. In order to provide a certain strength to the rim of the container, the foil layer needs to be made a certain thickness. In addition, due to the stiffness of the rim portion, it is difficult to deform the rim portion and therefore also difficult to peel the inner plastic layer from the outer paperboard layer.

FIGS. 4a-4d schematically show four steps in one example process of manufacturing a container 40 according to the current invention.

Figures 4A, 4C:
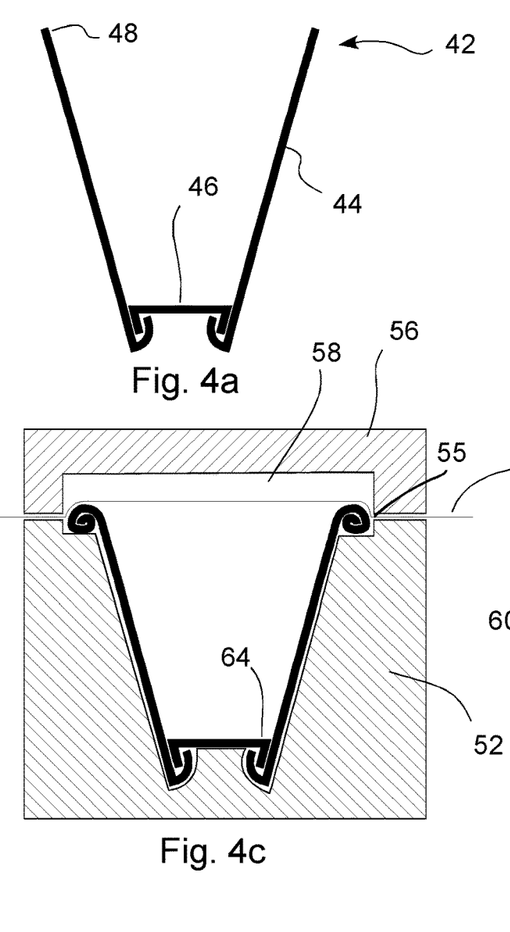
FIGS. 4a-4d schematically show four steps according to one embodiment of a method of manufacturing a combined plastic and paperboard container according to the invention.
Figure 4B:
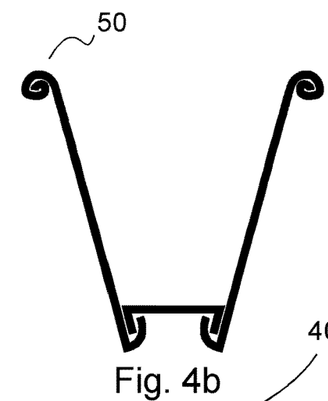

In FIG. 4a, a paperboard cup 42 similar to the ones provided in the prior art is formed. A paperboard sidewall 44 and a paperboard bottom 46 are formed into a paperboard container 42 as in the prior art. In step 4b, the upper portion 48 of the paperboard sidewall is rolled into a paperboard rolled up portion 50 in a manner which is well known in the art of paperboard cup manufacturing. By rolling the upper portion of the paperboard sidewall, the upper edge of the cup is stiffened and made stronger. In step 4c, the paperboard cup 42 is put into a lower mould half 52 which supports the paperboard cup. A thin plastic foil sheet 54 is arranged on top of the paperboard container 42. An upper mould half 56 is pressed down to squeeze the thin plastic foil sheet 54. Pressure is then introduced into the upper mould half in the volume 58 between the upper mould and the upper surface of the thin foil sheet 54. This causes the thin plastic foil sheet to expand and stretch downwardly to fit to the inner surface of the paperboard cup.

Furthermore, in one embodiment, a knife 55 is provided on a lower surface of the upper mould half. When the mould is closed, the knife provides an elongated area of reduced strength on the pull tab 62 by cutting into the material of the pull tab. In this case, the knife does not cut all the way through the thin plastic foil sheet. This means that the pull tab is not severed from the remainder of the thin plastic foil layer. The depth and position of the cut can be easily adjusted by adjusting the position and size of the knife.

In step 4d, the mould has been opened and the thin plastic foil sheet is cut, along the dotted lines shown in the figure to remove the container from the plastic foil sheet. A small portion 60 of the thin plastic foil sheet extends outwards from the rolled up portion. As can be seen from FIG. 4d, the rim portion in this embodiment, comprises a rolled up paperboard portion and a plastic foil portion. Since the paperboard portion is contributing to the strength of the rim, the plastic foil portion can be much thinner. This results in a much thinner inner plastic foil layer in the entire product and results in a much lower amount of plastic in the resulting container.

Figure 4D:
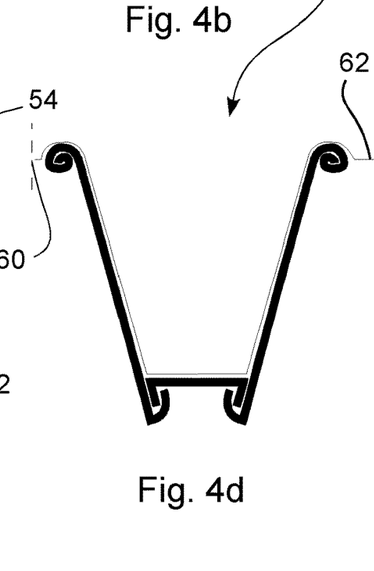

The small plastic portion 60 which extends past the outer edge of the rolled up portion, could be used as a snap edge for holding a snap on lid in place. The pull tab 62 is also shown in FIG. 4d.

In this embodiment, small holes (not shown) are made in the bottom paperboard 46 close to the junction 64 between the sidewall and the bottom. Also air vents (not shown) are made in the bottom part of the mould. In this way, when pressure is introduced into the upper mould half, the air which is located between the lower surface of the plastic foil sheet 54 and the inner surface of the paperboard cup, can escape. In one embodiment, the holes are cut or punched through the bottom portion of the paperboard layer.

It can also be noted, that in certain embodiments, an adhesive could be applied to the inner surface 64 of the paperboard sidewall and/or to the inner surface 66 of the inner surface of the paperboard bottom prior to thermoforming the plastic foil sheet. An adhesive layer could be applied as a solid covering, or as a pattern fill. For example a meshed pattern or a dotted pattern could be used.

Figure 5A:
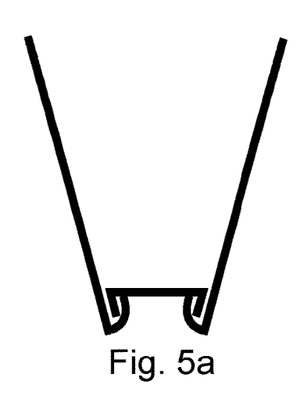
FIGS. 5a-5e schematically show five steps according to one embodiment of a method of manufacturing a combined plastic and paperboard container according to the invention.
Figure 5B:
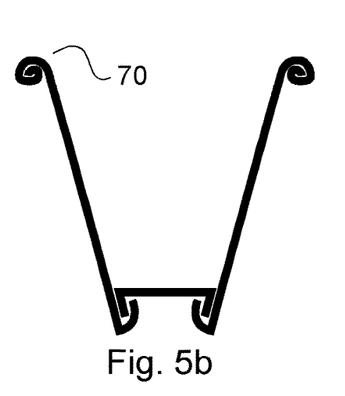
Figure 5C:
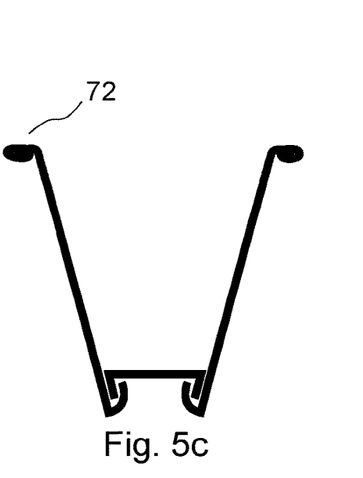
Figure 5D:
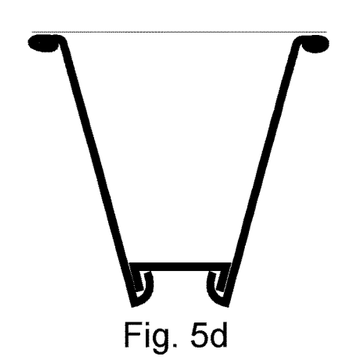
Figure 5E:
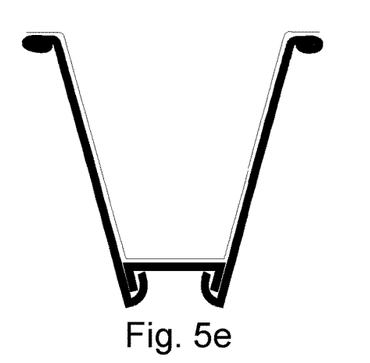

FIGS. 5a-5e show almost the same procedure as in FIGS. 4a-4d, and as such the figures will not be explained in detail, however, in the procedure of FIGS. 5a-5e, prior to thermoforming the plastic foil sheet, the rolled up portion 70 is compressed in a press and made into a flatten rolled up portion 72. This is shown in FIG. 5c. This extra step provides a flatter upper rim portion for the container. In some containers and for some applications, a flat upper rim is of value. For example a larger surface area is available for a heat sealed foil lid (not shown).

Figure 6:
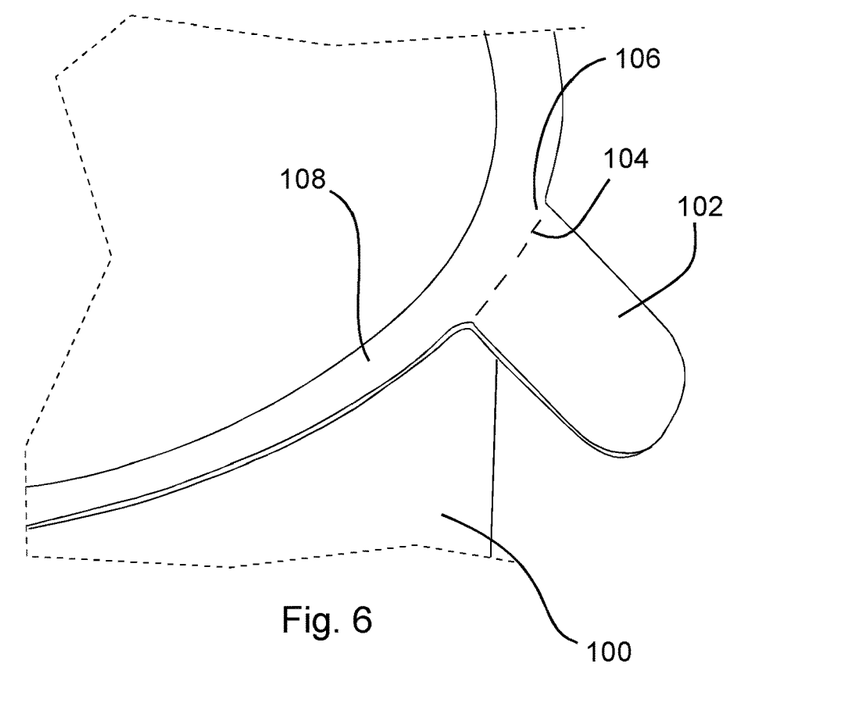
FIG. 6 schematically shows a perspective view of a portion of a container with a pull tab portion.

FIG. 6 shows a close-up view of a container 100 with a pull tab 102. In this case a row of perforations 104 is provided. It is important that the weakened area is not so weakened that when the pull tab is pulled by the user, it is detached from the remainder of the thin plastic foil layer. In this embodiment the perforations do not pass through the outer edge portion of the pull tab and a solid portion 106 connects the pull tab to the rim portion 108 of the container on either side of the pull tab portion.

Figure 7:
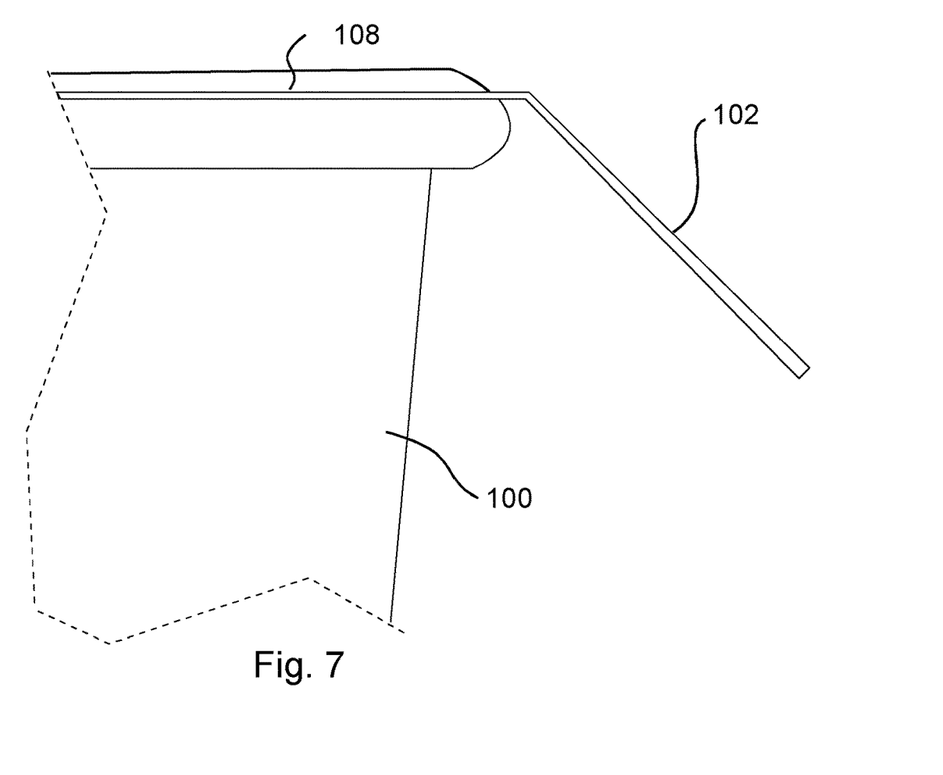
FIG. 7 schematically shows a side view of a portion of a container with a pull tab portion.

FIG. 7 shows a side view showing how the pull tab 102 is able to be easily bent down into a downwardly angled position to ensure that the pull tab can be bent properly when a lid is snapped onto the outer rim portion 108 of the container. As a side note, it should be noted that in one embodiment, the pull tab is biased in the manufacturing procedure to assume an angle to the upper surface of the rim portion of between 0 and 45 degrees. In this way, the pull tab does not occupy so much space when in storage but also when the containers are stacked in a stack of empty containers, the pull tabs do not get in the way of the stacking.

The tab can be biased in different ways. One way is to mechanically bend the pull tab downwardly after the cutting operation. Another way is to heat the pull tab slightly to make it slightly soft, bend it down and then let it cool. This will keep the tab in the downwardly bent position with less need for mechanical force. Another way is to bend the entire outer portion of the thin plastic foil arranged outside the outer rim of the paperboard layer in the thermoforming process. Then the cutting operation can cut the preformed outer portion.

Figure 8:
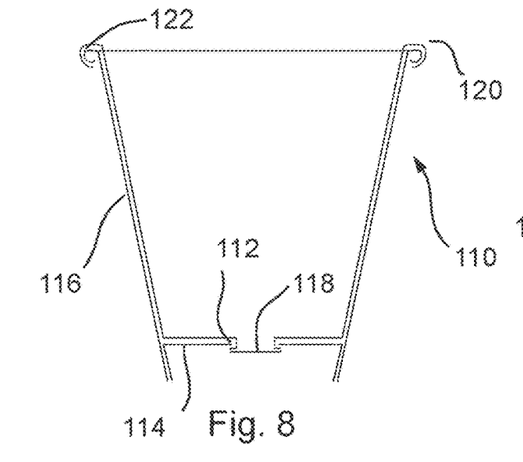
FIG. 8 shows a schematic cross sectional view of an embodiment of a container according to the invention.

FIG. 8 shows an embodiment of a container 110 having a single recess 112 in the bottom 114 of the paperboard layer 116. In this embodiment the recess is formed as a through going hole in the paperboard layer. During the thermoforming operation, the thin inner plastic foil layer 118 will extend out through the recess. The thermoforming mould can be arranged with a corresponding recess or depression to control the shape of the portion fo the thin inner plastic foil layer which extends out through the recess. The sticking out portion will form a mechanical connection between the paperboard portion and the thin inner plastic foil layer.

Furthermore, the upper portion 120 of the thin inner plastic foil layer 118 is arranged to wrap around the rolled up portion 122 of the upper rim portion of the paperboard portion of the sidewall. In this case, the upper edge and the lower part of the thin inner plastic foil layer are held in place with respect to the paperboard layer and it is not necessary to use adhesive to maintain the structural integrity of the container.

Figure 9:
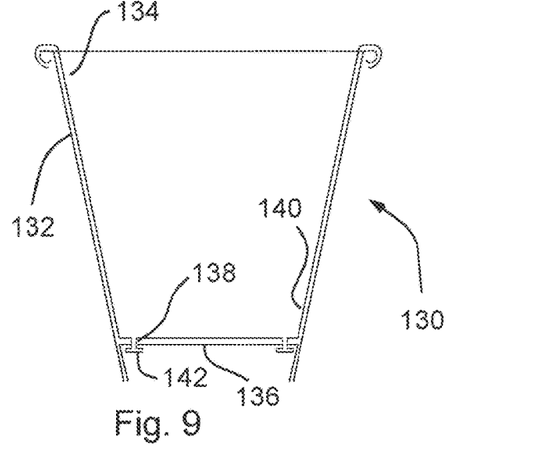
FIG. 9 shows a schematic cross sectional view of an embodiment of a container according to the invention.

FIG. 9 shows a container 130 with a paperboard outer layer 132 and a thin inner plastic foil layer 134. In the bottom 136 of the paperboard layer, there is a series of small through going recesses 138 arranged at the interface between the bottom and the sidewall 140. As with the previous embodiment, the thin inner plastic foil layer extends out through the through going recess to form small locking elements 142 which mechanically connect the paperboard layer and the thin inner plastic foil layer.

Figure 10:
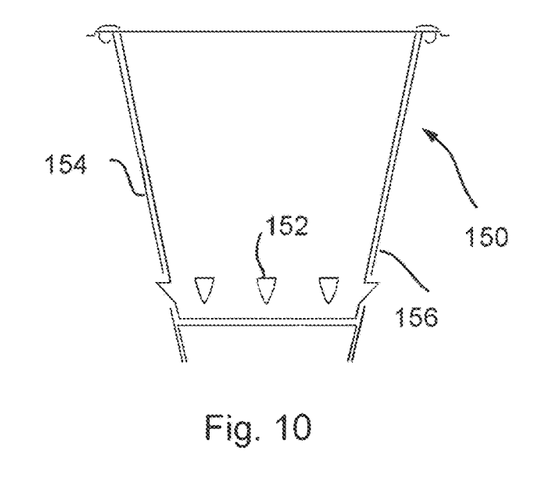
FIG. 10 shows a schematic cross sectional view of an embodiment of a container according to the invention.

FIG. 10 shows a container 150 with a series of small recesses 152 arranged in the paperboard layer 154 of the sidewall 156 near the bottom portion of the sidewall. This holds onto the bottom of the foil. The recesses are in this embodiment formed with a straight upper edge and a pointed lower edge. In this way, the upper straight edge holds onto the foil layer. However, other forms of recesses could also be imagined. In one embodiment (not shown), the recesses are arranged as horizontal lines which form a grid like structure into which the plastic foil can engage.

In this embodiment the recesses are through going holes passing through the thickness of the paperboard layer. However in another embodiment (not shown) the recesses could be depressions in the paperboard layer which do not pass through the paperboard layer. In this case, the depressions could be formed by pressing a pattern into the inner surface of the paper board layer. In cases where the paperboard layer is very thick, this will be a good solution if it is desired to avoid through going holes.

Figure 11:
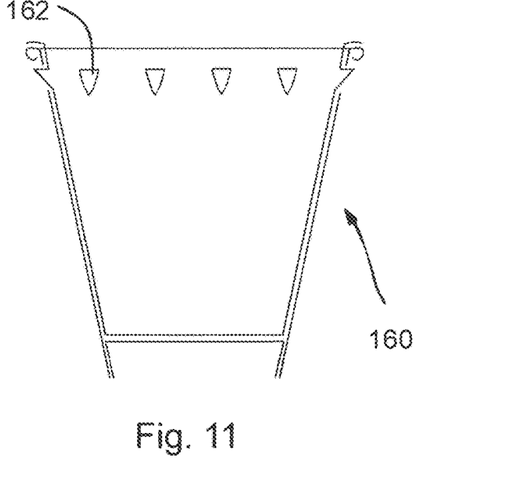
FIG. 11 shows a schematic cross sectional view of an embodiment of a container according to the invention.

FIG. 11 shows an embodiment of a container 160 similar to the container of FIG. 10, but where the recesses 162 are arranged along the upper seam of the container. This has a benefit in that the upper portion of the thin plastic sheet is often thicker due to it not being stretched as much as the bottom portion.

Figure 12:
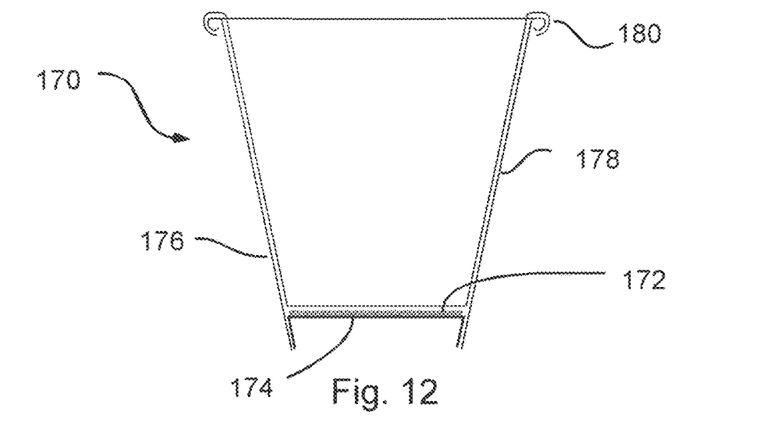
FIG. 12 shows a schematic cross sectional view of an embodiment of a container according to the invention.

FIG. 12 shows an embodiment of a container 170 where adhesive 172 is applied to the bottom 174 of the paperboard layer 176, but not to the sidewall 178 of the paperboard layer. This is much simpler to handle in the manufacturing process and still provides for a good strength. Furthermore less adhesive will be used which will make it easier to recycle the container. Also, the container will be easier to separate. Furthermore, by applying the adhesive in a pattern, even less adhesive can be used. By combining adhesive on the bottom and a wrap around upper edge 180, a good integrity can be provided.

Figure 13:
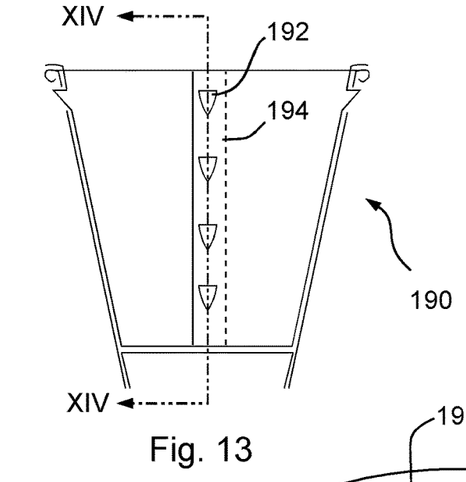
FIG. 13 shows a schematic cross sectional view of an embodiment of a container according to the invention.
Figure 14:
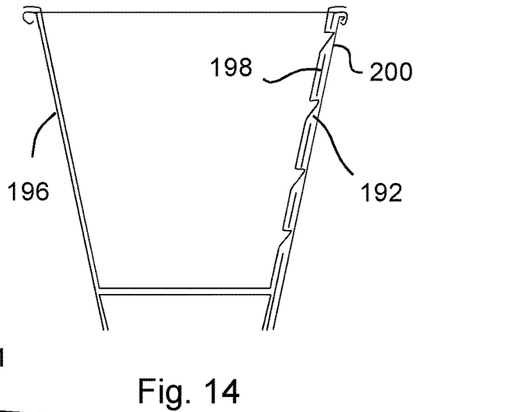
FIG. 14 shows a schematic cross sectional view of the embodiment of FIG. 13 according to the line XIV-XIV defined in FIG. 13.
Figure 15:
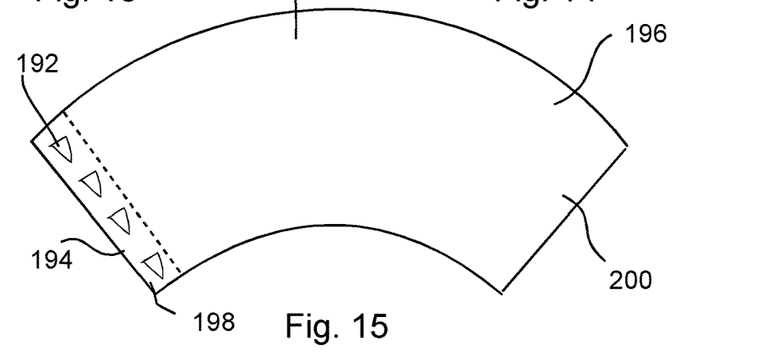
FIG. 15 schematically shows a side view of the sidewall blank of the container of FIG. 13 prior to it being formed into the sidewall.

FIGS. 13-15 shows different views of a container 190 or a sidewall blank 191 of the container showing an option where the recesses 192 are arranged along the side seam 194 of the paperboard layer 196 of the container. In this embodiment, the recesses are arranged on the inner portion 198 of the sidewall and the "holes" are not seen on the outside of the container since they are overlapped by an outer portion 200 of the paperboard layer.

In one embodiment (not shown), recesses which do not pass through the paperboard layer could be added to the outer portion of the side seam of the embodiment of FIGS. 13-15. If the recesses in the inner portion and in the outer portion were aligned this would give an even deeper depression to engage with. Also, in another embodiment, by misaligning the depressions on the outer portion and the holes in the inner portion, an edge can be provided which can engage even more firmly with the thin inner plastic foil layer.

Figure 16:
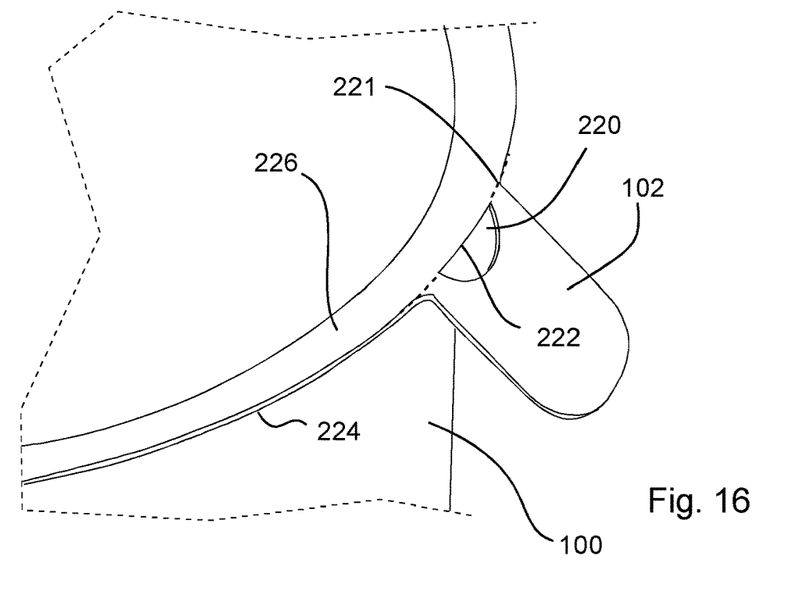
FIG. 16 schematically shows a perspective view of a close-up of an alternative embodiment of a pull tab.

FIG. 16 shows a container and a pull tab which is very similar to the embodiment shown in FIGS. 6 and 7. As such the identical details will not be described here. However, the difference is in the form of the elongated area of reduced strength 220. In the previous embodiments, an area of reduced strength was provided by a partial cut or a line of perforations. In this embodiment, the area of reduced strength 220 is provided as a cut out portion in the central portion of the pull tab adjacent the outer periphery of the upper rim of the container.

By cutting an entire portion 220 out of the pull tab, the pull tab becomes much more flexible. Also, the inside edge 222 (ie the edge closest to the inside of the container) of the cutout portion 220 could be arranged to continue the path 221 of the outer periphery 224 of the upper portion of the thin plastic foil layer 226. In this way, when the pull tab is bent downwardly, the inside edge 222 of the cut out portion is exposed and can engage with a snap on lid. The pull tab is still connected to the remaining portion of the thin plastic foil layer via two bridges 228. Depending on the thickness of the remaining bridges, it could be imagined that the bridges are perforated lightly or cut partially to allow them to bend more.

In this kind of embodiment, the cut out portion could be cut out when the container is in the thermoforming mould via a cutting knife as described above. In one embodiment, the inside edge 222 of the cut-out portion is provided outside the outer periphery of the rolled up portion of the upper rim of the paperboard layer. In this way, a knife arranged in one part of the mould could be pressed up against a surface of the other part of the mould when the mould is closed, without damaging the rolled up portion of the paperboard layer.

It is to be noted that the figures and the above description have shown the example embodiments in a simple and schematic manner. Many of the specific mechanical details have not been shown since the person skilled in the art should be familiar with these details and they would just unnecessarily complicate this description. For example, the specific materials used and the specific thermoforming procedures have not been described in detail since it is maintained that the person skilled in the art would be able to find suitable materials and suitable processes to manufacture the container according to the current invention.

The invention claimed is:

1. A container comprising a bottom and a sidewall extending upwards from the bottom and terminating at an upper free edge, said upper free edge of the sidewall forming an opening of the container, said sidewall and said bottom comprising an outer paperboard layer and a thin inner plastic foil layer formed via a thermoforming operation, said upper free edge of the sidewall comprising a rim portion extending past the outer surface of the paperboard layer of the sidewall, wherein said rim portion comprises a rolled up portion of an upper portion of the outer paperboard layer of the sidewall, said rolled up portion being covered by a portion of the thin inner plastic foil layer, wherein the paperboard layer of the sidewall and/or the bottom comprise at least one recess extending at least partially through the paperboard layer of the sidewall and/or the bottom respectively and in that the thin inner plastic foil layer extends into the at least one recess, and wherein the thin inner plastic foil layer extends through the at least one recess from an interior surface of the container to an exterior surface of the container, and wherein the thin inner plastic foil layer extending through the at least one recess forms a locking element mechanically connecting the paperboard layer and the thin inner plastic foil layer.

2. The container according to claim 1, wherein the rolled up portion of the outer paperboard layer has been pressed flat.

3. A container according to claim 1, wherein the thin inner plastic foil layer is made from a plastic foil having a thickness of less than a thickness T µm prior to the start of the thermoforming operation found by the formula T=200 * surface area of stretched foil/surface area of unstretched foil.

4. A container according to claim 1, wherein the outer paperboard layer of the bottom is joined to the thin inner plastic foil layer of the bottom with an adhesive and in that the outer paperboard layer of the sidewall is not joined to the thin inner plastic foil layer of the sidewall with an adhesive.

5. A container according to claim 1, wherein the outer paperboard layer of the bottom comprises a first paperboard portion covering the bottom of the container and a second paperboard portion which is folded away from the first paperboard portion, an inner surface of said first paperboard portion being in contact with an outer surface of the thin inner plastic foil layer, and an outer surface of said second paperboard portion abutting an inner surface of the outer paperboard layer of the sidewall.

6. A container according to claim 1, wherein the upper rim of the container is arranged in a horizontal plane and has a rectangular shape with rounded corners and in that the bottom is arranged in a horizontal plane and has a rectangular shape with rounded corners.

7. A container according to claim 1, wherein the paperboard layer of the side wall comprises said at least one recess.

8. A container according to claim 7, wherein said at least one recess has a shape with a straight section at the upper side of the recess, said straight section having a portion which is perpendicular to a centre axis of the container.

9. A container according to claim 7, wherein said at least one recess is arranged in an upper 20% of the container or arranged on a lower 20% of the container.

10. A container according to claim 1, wherein the container further comprises a snap on lid which is arranged to snap onto the outer rim of the container.

11. A container according to claim 1, wherein the container further comprises a foil lid which is glued or welded to the upper rim of the container.

* * * * *